United States Patent
Kim et al.

(10) Patent No.: US 9,857,630 B2
(45) Date of Patent: Jan. 2, 2018

(54) DISPLAY DEVICE

(71) Applicant: Samsung Display Co., Ltd., Yongin-Si, Gyeonggi-Do (KR)

(72) Inventors: Juhee Kim, Bucheon-si (KR); Kijong Kim, Chungcheongbuk-do (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/234,289

(22) Filed: Aug. 11, 2016

(65) Prior Publication Data

US 2017/0192302 A1 Jul. 6, 2017

(30) Foreign Application Priority Data

Dec. 30, 2015 (KR) .................. 10-2015-0190065

(51) Int. Cl.
*G02F 1/1335* (2006.01)
(52) U.S. Cl.
CPC .. *G02F 1/133605* (2013.01); *G02F 1/133603* (2013.01)
(58) Field of Classification Search
CPC ............... G02F 1/133605; G02F 1/133603
See application file for complete search history.

(56) References Cited

U.S. PATENT DOCUMENTS

| 2007/0103908 A1* | 5/2007 | Tabito | G02F 1/133608 362/294 |
|---|---|---|---|
| 2010/0014015 A1 | 1/2010 | Ho et al. | |
| 2015/0029692 A1 | 1/2015 | Chung et al. | |

FOREIGN PATENT DOCUMENTS

| JP | 2012118440 A | 6/2012 |
|---|---|---|
| JP | 2014153393 A | 8/2014 |
| JP | 2015040918 A | 3/2015 |

* cited by examiner

*Primary Examiner* — Mary Ellen Bowman
(74) *Attorney, Agent, or Firm* — Cantor Colburn LLP

(57) ABSTRACT a display device includes a display panel, a backlight unit disposed under the display panel to provide light to the display panel, and a cover member which accommodate the backlight unit. The cover member includes a bottom part, a plurality of sidewall parts bent from the bottom part, and a plurality of seat parts extending from the sidewall parts. The backlight unit includes a plurality of light emitting elements disposed on a top surface of the bottom part, and a reflective sheet including a reflective part overlapping the top surface of the bottom part, a plurality of sidewall reflective parts connected to the reflective part to correspond to the sidewall parts, a plurality of seat reflective parts connected to the sidewall reflective, where coupling openings are defined therein, and coupling parts extending from the seat reflective parts and inserted into the coupling openings.

14 Claims, 6 Drawing Sheets

DISPLAY DEVICE

This application claims priority to Korean Patent Application No. 10-2015-0190065, filed on Dec. 30, 2015, and all the benefits accruing therefrom under 35 U.S.C. §119, the content of which in its entirety is herein incorporated by reference.

BACKGROUND

1. Field

The disclosure herein relates to a display device, and more particularly, to a display device including a reflective sheet.

2. Description of the Related Art

The display device may include a backlight unit including a plurality of light emitting diodes ("LED"s) as a light source. Generally, the backlight unit in which the plurality of LEDs are disposed may be classified into an edge type backlight and a direct type backlight according to a position of the light source.

The LEDs may have a shape of a bar, of which one side surface is long in length, and the LEDs may be disposed on a side surface of the edge type backlight unit. The edge type backlight unit may include a light guide plate to irradiate light to an entire surface of a LCD panel. In the direct type backlight, the LEDs may be disposed below a display panel of the direct type backlight unit. The direct type backlight unit irradiates light from a surface light source having the same area as the display panel to an entire surface of the display panel. Such a backlight unit typically includes a reflective sheet disposed on a lower portion of the light source. The reflective sheet may reflect light emitted from the light source toward the display panel.

In such a backlight unit typically including a reflective sheet, a printed pattern for uniformly providing the light emitted from the light source to the entire surface of the display panel may be defined on the reflective sheet.

SUMMARY

The disclosure provides a display device including a backlight unit that is capable of uniformly providing light to a display panel.

An embodiment of the inventive concept provides a display device including: a display panel; a backlight unit disposed under the display panel to provide light to the display panel; and a cover member which accommodates the backlight unit, where the cover member includes a bottom part, a plurality of sidewall parts bent from the bottom part, and a plurality of seat parts respectively extending from the sidewall parts. The backlight unit includes: a plurality of light emitting elements disposed on a top surface of the bottom part; and a reflective sheet including: a reflective part overlapping the top surface of the bottom part; a plurality of sidewall reflective parts connected to the reflective part to correspond to the sidewall parts, respectively; a plurality of seat reflective parts connected to the sidewall reflective parts to correspond to the seat parts, respectively, where coupling openings defined in at least a portion of the seat reflective parts; coupling parts extending from the seat reflective parts, respectively, and inserted into the coupling openings, respectively.

In an embodiment, the seat reflective parts may include first to fourth seat reflective parts, respectively, the first and second seat reflective parts may be spaced apart from each other in a first direction, the coupling openings may include first and second coupling openings defined in the first and second seat reflective parts, respectively, the third and fourth seat reflective parts may be spaced apart from each other in a second direction crossing the first direction, and the coupling parts may include a first coupling part extending from the third seat reflective part and inserted into the first coupling opening of the first seat reflective part and a second coupling part extending from the fourth seat reflective part and inserted into the second coupling opening of the second seat reflective part.

In an embodiment, the coupling openings may further include third and fourth coupling openings defined in the first and second seat reflective parts, respectively, and the coupling parts may further include a third coupling part extending from the third seat reflective part and inserted into the fourth coupling opening of the second seat reflective part and a fourth coupling part extending from the fourth seat reflective part and inserted into the third coupling opening of the first seat reflective part.

In an embodiment, the coupling openings may further include third and fourth coupling openings defined in the third and fourth seat reflective parts, respectively, and the coupling parts may further include a third coupling part extending from the first seat reflective part and inserted into the fourth coupling opening and a fourth coupling part extending from the second seat reflective part and inserted into the third coupling opening.

In an embodiment, each of the first and second coupling openings may have a slit shape.

In an embodiment, the sidewall reflective parts may include first to fourth sidewall reflective parts connected to the first to fourth seat reflective parts, respectively, and the first to fourth sidewall reflective parts may be separable from each other.

In an embodiment, the first sidewall reflective part may have one side and the other side, which are connected to one side of the third sidewall reflective part and one side of the fourth sidewall reflective part, respectively, and the second sidewall reflective part may have one side and the other side, which are connected to the other side of the third sidewall reflective part and the other side of the fourth sidewall reflective part, respectively.

In an embodiment, the seat reflective parts may include: first to fourth seat reflective parts, the first and second seat reflective parts are spaced apart from each other in a first direction, and the third and fourth seat reflective parts are spaced apart from each other in a second direction crossing the first direction, and the sidewall reflective parts may include a first sidewall reflective part and a second sidewall reflective part, which are connected to the first seat reflective part and the second seat reflective part, respectively. In such an embodiment, the first seat reflective part may have a length in the second direction the same as a length of a first sidewall reflective part in the second direction, and the second seat reflective part may have a length in the second direction the same as a length of a second sidewall reflective part in the second direction.

In an embodiment, the sidewall reflective parts may further include a third sidewall reflective part connected to the third seat reflective part, and the third seat reflective part may have a length in the first direction which is greater than a length of the third sidewall reflective part in the first direction.

In an embodiment, the third seat reflective part may include a central area connected to the third sidewall reflective part and first and second extension areas extending from the central area in the first direction to opposite to each other. The first extension area of the third seat reflective part may be connected to one side portion of the first seat reflective part, and the second extension area of the third seat reflective part may be connected to one side portion of the second seat reflective part.

In an embodiment, the coupling part may be connected to an area of the third seat reflective part which extends further from the third sidewall reflective part when viewed in a plan view.

In an embodiment, a plurality of brightness degradation patterns may be disposed on each of the sidewall reflective parts.

In an embodiment, each of the brightness degradation patterns may have a grey color.

In an embodiment, a plurality of openings, through which the light emitting elements are exposed, may be defined in the reflective part.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
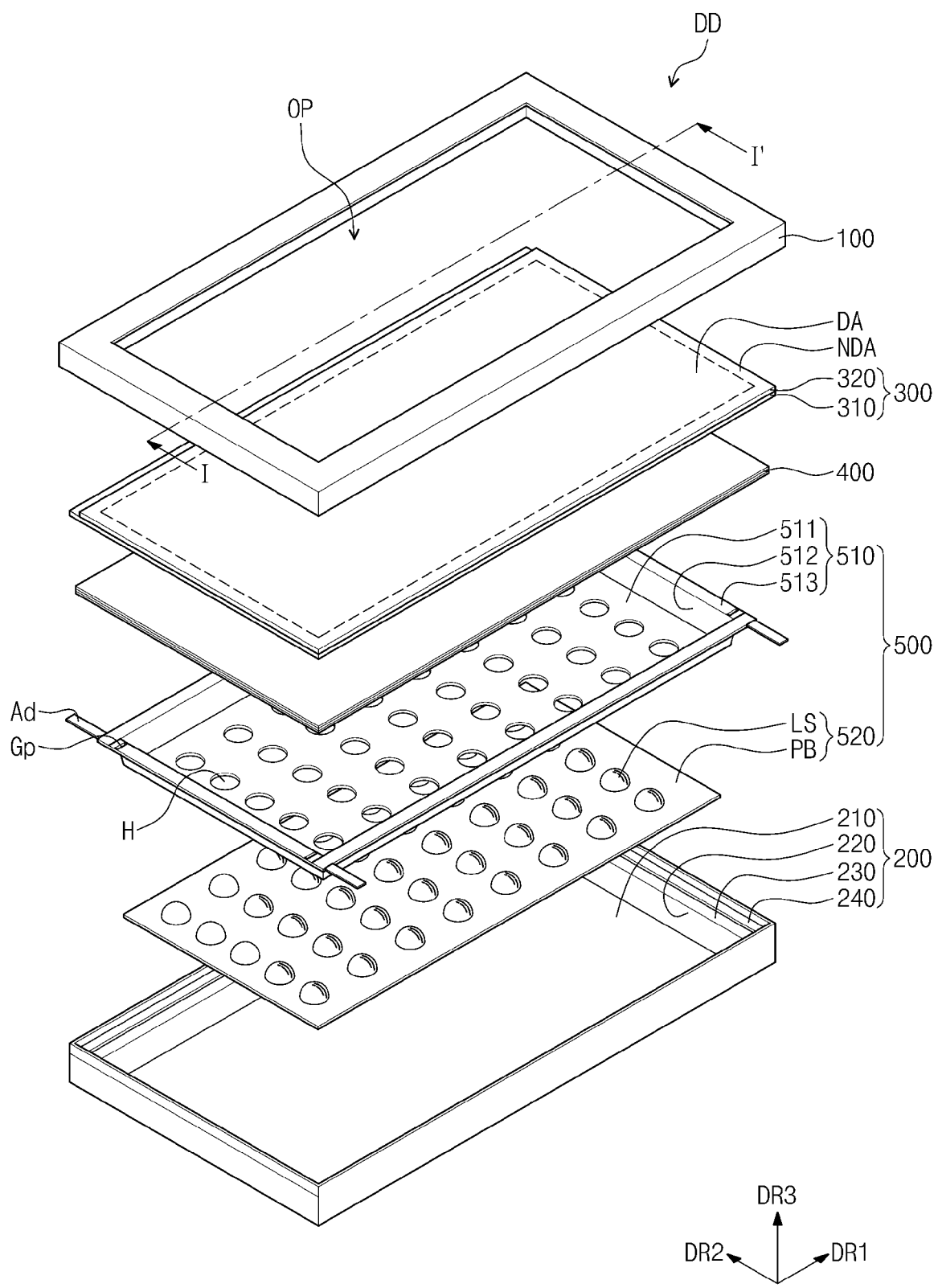
FIG. 1 is an exploded perspective view of a display device according to an embodiment of the inventive concept.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the inventive concept will be described in detail with reference to the accompanying drawings.

Figure 2:
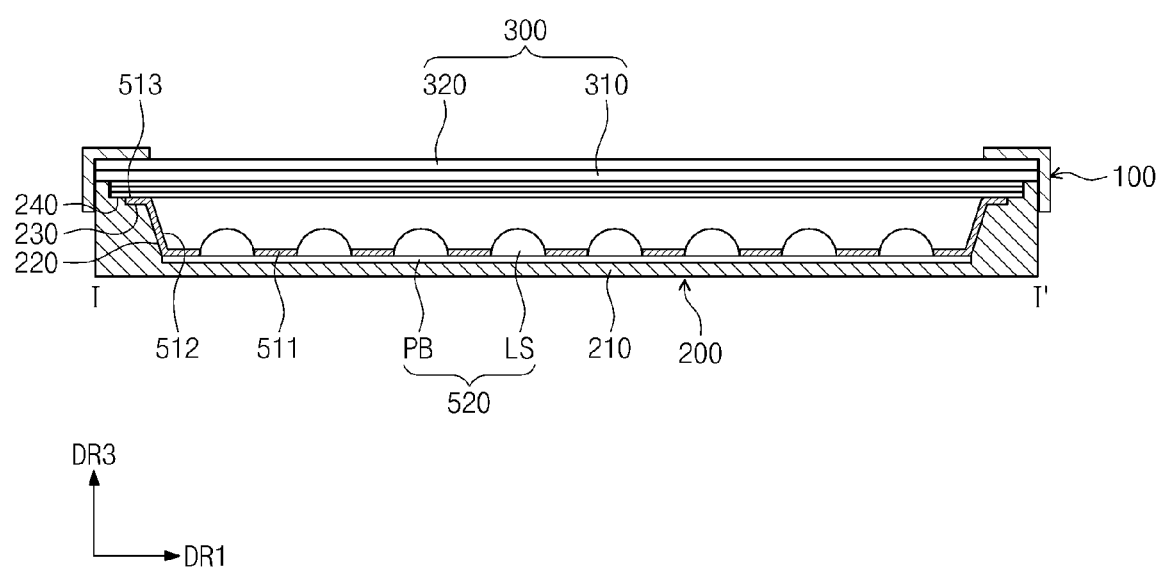
FIG. 2 is a cross-sectional view taken along line I-I' of the display device in FIG. 1.

FIG. 1 is an exploded perspective view of a display device according to an embodiment of the inventive concept. FIG. 2 is a cross-sectional view taken along line I-I' of the display device in FIG. 1.

According to an embodiment, a display device DD may be used for large-sized electronic devices, such as a television or an outdoor advertising board, or small and medium sized electronic devices such as a personal computer ("PC"), a notebook computer, a navigation unit for vehicle, and a camera. Such an embodiment of the display device DD may be a tablet PC, a smartphone, a personal digital assistant ("PDA"), a portable multimedia player ("PMP"), a game console, a wrist watch type electronic device or the like. These are only exemplary embodiments, and other electronic devices may be adoptable when they are not deviated from a concept of the disclosure.

Referring to FIGS. 1 and 2, an embodiment of the display device DD includes a first cover member 100, a second cover member 200, a display panel 300, an optical member 400, and a backlight unit 500.

The first and second cover members 100 and 200 may accommodate and protect the display panel 300, the optical member 400 and the backlight unit 500.

In an embodiment, the first cover member 100 may be disposed on an upper portion of the display panel 300, and an opening OP that exposes a display area DA of the display panel 300 is defined therein. In an alternative embodiment, a display device may have a structure in which the first cover member 100 is omitted.

The second cover member 200 may be disposed on a lower portion of the backlight unit 500, and accommodate the display panel 300, the optical member 400 and the backlight unit 500. The second cover member 200 may include a bottom part 210, sidewalls 220, seat parts 230, and optical seat parts 240.

The bottom part 210 may have a rectangular shape defined in a first direction DR1 and a second direction DR2. According to an embodiment, the bottom part 210 may have a long side in a first direction DR1 and a short side in a second direction DR2 substantially perpendicular to the first direction DR1.

Each of the sidewalls 220 may have a shape extending from edges of the bottom part 210 in a third direction DR3 that is perpendicular to the first and second directions DR1 and DR2. In one embodiment, for example, the sidewalls 220 may include first to fourth sidewalls extending from the four edges of the bottom part 210, respectively.

The seat part 230 may have a shape extending inwardly from the sidewalls 220. The reflective sheet 510 may be disposed or seated on the seat parts 230. In one embodiment, for example, the seat parts 230 may include first to fourth seat parts extending from the first to fourth sidewalls, respectively.

The optical seat part 240 may be connected to the seat parts 230 and have a stepped shape. The optical member 400 may be disposed or seated on the optical seat parts 240. In one embodiment, for example, the optical seat parts 240 may include the first to fourth optical seat parts extending from the first to fourth seat parts, respectively.

In an embodiment of the inventive concept, as described above, the second cover member 200 includes the optical seat parts 240, but the inventive concept is not limited thereto. In an alternative embodiment, the optical seat parts 240 may be seated on a separate mold member (not shown), which is not provided to the second cover member, together with the display panel 300.

The display panel 300 is parallel to a surface defined by the first direction DR1 and the second direction DR2. The third direction DR3 indicates a direction normal to the display panel 300. The third direction DR3 indicates a thickness direction of the display device DD. Front and rear surfaces of each of the members are distinguished by the third direction DR3.

According to an embodiment, the display panel 300 may be a liquid crystal display panel, an electrophoretic display panel or an electro-wetting display panel, for example. Hereinafter, for convenience of description, an embodiment where the display panel 300 is the liquid crystal panel including a liquid crystal layer (not shown) will be described in detail.

In an embodiment, the display panel 300 may be disposed on a lower portion of the first cover member 100. The display panel 300 may include a first substrate 310, a second substrate 320 facing the first substrate 310, and a liquid crystal layer (not shown) disposed therebetween. In such an embodiment, the display panel 300 includes a display area DA for displaying an image and a non-display area NDA surrounding the display area DA, on which a plurality of driving devices, which are typically used to display an image, are disposed.

The optical member 400 may be disposed between the display panel 300 and the backlight unit 500. The optical member 400 receives light from the backlight unit 500 and enhances characteristics of the received light to provide the received light to the display panel 300. In one embodiment, for example, the optical member 400 may include a diffusion member. The diffusion member may uniformly diffuse incident light. In an embodiment, the optical member 400 may further include a light collecting sheet that collects light received from the diffusion member, and a protection sheet that protects the diffusion member and/or the light collecting sheet. In such an embodiment, the optical member 400 may include a plurality of sheets.

The backlight unit 500 may be disposed below or on a lower portion of the optical member 400 to provide light to the display panel 300 through the optical member 400. The display panel 300 uses the light provided from the backlight unit 500 to display an image.

The backlight unit 500 includes a reflective sheet 510 that reflects light, and a light source 520 that provides light to the display panel 300.

The reflective sheet 510 may be disposed below or on the lower portion of the optical member 400, and reflect light from light emitting elements LS of the light source 520 and incident to a rear side and side surface thereof, to re-direct the light to the optical member 400. In such an embodiment, the reflective sheet 510 may include a reflective part 511, sidewall reflective parts 512, seat reflective parts 513, and a coupling part Ad.

In an embodiment, as shown in FIG. 1, a plurality of openings HL for exposing the plurality of light emitting elements LS are defined in the reflective part 511. In such an embodiment, the openings HL respectively overlapping the light emitting elements LS are defined in the reflective part 511. In an embodiment, as illustrated in FIG. 2, the reflective part 511 may be disposed on or to overlap the bottom part 210 of the second cover member 200.

Each of the sidewall reflective parts 512 may have a shape extending or connected from edges of the reflective part 511 in the third direction DR3. In an embodiment, as illustrated in FIG. 2, the sidewall reflective part 512 may be disposed on or to overlap the sidewalls 220 of the second cover member 200.

Each of the seat reflective parts 513 may have a shape extending or connected from the sidewall reflective parts 512. In an embodiment, as illustrated in FIG. 2, the seat reflective parts 513 may be disposed on or to overlap the seat parts 230 of the second cover member 200.

According to an embodiment of the inventive concept, the coupling part Ad may be connected to each of corresponding seat reflective parts of the seat reflective parts 513.

In an embodiment, a coupling opening Gp is defined in at least one of the seat reflective parts 513, and the coupling part Ad is inserted into the coupling opening Gp. In such an embodiment, the coupling part Ad connected from one of the seat reflective parts 513 may be inserted into the coupling opening Gp defined in another seat reflective part.

In one embodiment, for example, two coupling parts may be connected to each of two seat reflective parts of the seat reflective parts 513. In such an embodiment, two coupling openings may be defined in each of the remaining two coupling parts of the seat reflective parts 513. The coupling parts connected to each of the two seat reflective parts may be inserted into the corresponding coupling opening of the coupling openings defined in the remaining two seat reflective parts.

In one embodiment, for example, one coupling part may be connected to each of the seat reflective parts 513. In such an embodiment, one coupling opening may be defined in each of the seat reflective parts 513. In such an embodiment, the coupling part connected to each of the seat reflective parts may be inserted into the coupling opening defined in a corresponding seat reflective part of the other seat reflective parts.

In an embodiment, as described above, through a coupling structure between the coupling part Ad and the coupling opening Gp, the sidewall reflective parts 512 and the seat reflective parts 513 may be effectively coupled to each other. The structure of the reflective sheet 510 will be described in greater detail later with reference to FIG. 3.

The light source 520 includes a plurality of light emitting elements LS that generates light, and a driving circuit board PB on which the light emitting elements LS are disposed. In an embodiment, the light emitting elements LS may include a light emitting diode.

In an embodiment, the light emitting elements LS may be inserted into the openings HL defined in the bottom part 511, respectively. In such an embodiment, the light emitting elements LS may be inserted into the openings HL of the reflective sheet 510 in the third direction DR3 so that the reflective sheet 510 and the driving circuit board PB are coupled to each other. In an embodiment, the light emitting elements LS may be spaced apart from each other with a uniform distance, or by a constant interval, in the first and second directions DR1 and DR2 on the driving circuit board PB. In such an embodiment, the light emitting elements LS may be arranged substantially in a matrix form on the driving circuit board PB.

Figure 3:
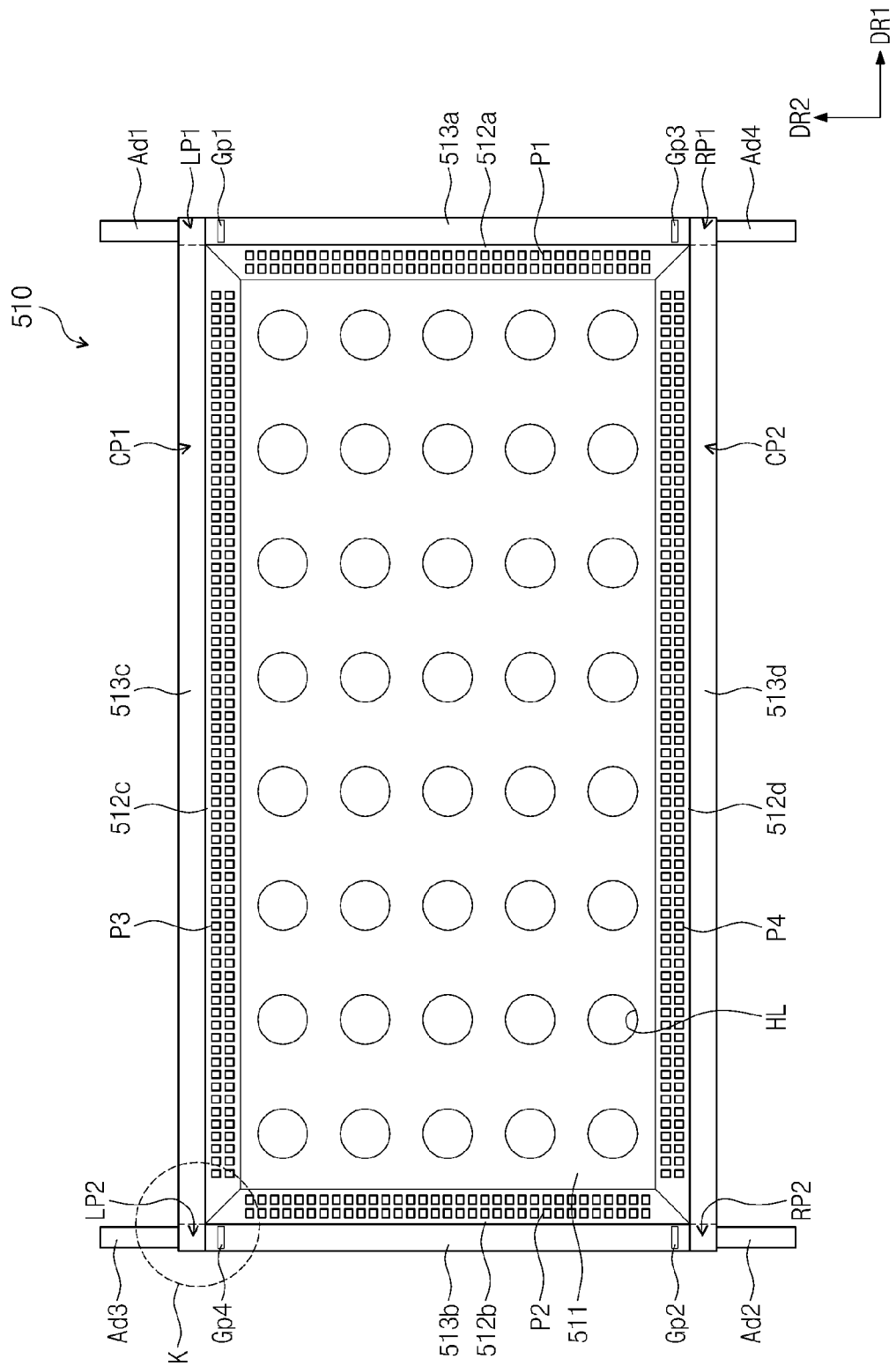
FIG. 3 is a plan view of a reflective sheet in FIG. 1 according to an embodiment of the inventive concept.
Figure 4:
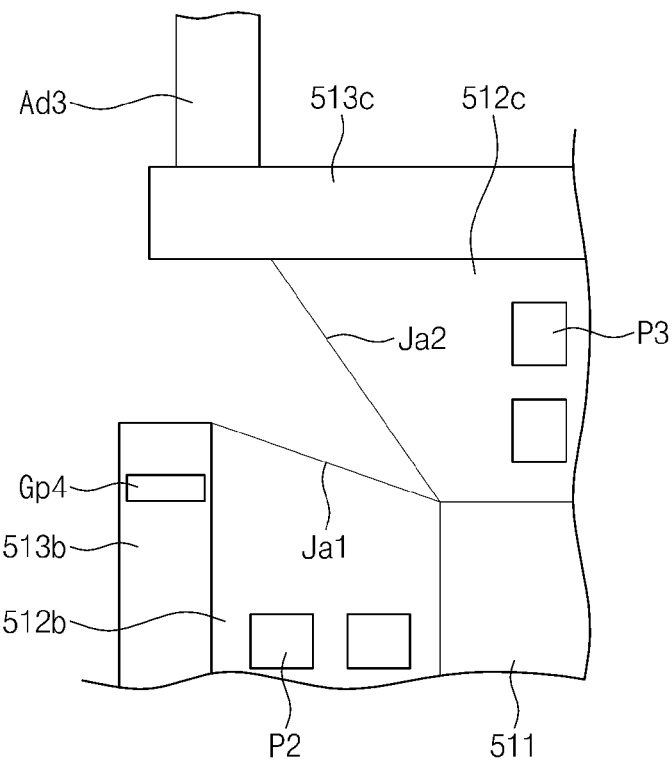
FIG. 4 is an enlarged view of a region K in FIG. 3.

FIG. 3 is a perspective view of the reflective sheet in FIG. 1 according to an embodiment of the inventive concept. FIG. 4 is an enlarged view of a region K in FIG. 3;

Referring to FIGS. 1 and 3, an embodiment of the reflective sheet 510 includes the reflective part 511, the sidewall reflective part 512 and the seat reflective part 513.

In an embodiment, as described above, the plurality of openings HL, into which the light emitting elements LS are inserted, may be defined in the reflective part 511.

The sidewall reflective part 512 may include first to fourth sidewall reflective parts 512a to 512d. Each of the first to fourth sidewall reflective parts 512a to 512d may have a shape bent from the reflective part 511 and overlaps each of the sidewalls 220 of the second cover member 200 in FIG. 1. In an embodiment, the first sidewall reflective part 512a and the second sidewall reflective part 512b may be spaced apart from each other in the first direction DR1. In such an embodiment, each of the first sidewall reflective part 512a and the second sidewall reflective part 512b may have a shape extending in the second direction DR2.

In an embodiment, the third sidewall reflective part 512c and the fourth sidewall reflective part 512d may be spaced apart from each other in the second direction DR2 crossing the first direction DR1. In such an embodiment, each of the third sidewall reflective part 512c and the fourth sidewall reflective part 512d may have a shape extending in the first direction DR1.

According to an embodiment of the inventive concept, the first to fourth sidewall reflective parts 512a to 512d are not integrally formed as a single unitary and indivisible unit, and a cut-out area may be defined in at least two of the sidewall reflective parts. In one embodiment, for example, one side of the first sidewall reflective part 512a contacts one side of the third sidewall reflective part 512c, and the other side of the first sidewall reflective part 512a contacts one side of the fourth sidewall reflective part 512d. In one embodiment, for example, one side of the second sidewall reflective part 512b contacts the other side of the third sidewall reflective part 512c, and the other side of the second sidewall reflective part 512b contacts the other side of the fourth sidewall reflective part 512d.

In such an embodiment, the one side and the other side of the first sidewall reflective part 512a may be both side edges of the first sidewall reflective part 512a in the second direction DR2. The one side and the other side of the second sidewall reflective part 512b may be both side edges of the second sidewall reflective part 512b in the second direction DR2. The one side and the other side of the third sidewall reflective part 512c may be both side edges of the third sidewall reflective part 512c in the first direction DR1. The one side and the other side of the fourth sidewall reflective part 512d may be both side edges of the fourth sidewall reflective part 512d in the first direction DR1.

In one embodiment, for example, as illustrated in FIG. 4, one side (Ja1) of the second sidewall reflective part 512b may be separable (e.g., not integrally formed as a single unitary) from or contact the other side (Ja2) of the third sidewall reflective part 512c. In one embodiment, for example, when a third coupling part Ad3 is inserted into a fourth coupling opening Gp4, the one side Ja1 of the second sidewall reflective part 512b and the other side Ja2 of the third sidewall reflective part 512c may contact each other. In such an embodiment, when the third coupling part Ad3 is separated from the fourth coupling opening Gp4, the one side Ja1 of the second sidewall reflective part 512b and the other side Ja2 of the third sidewall reflective part 512c may be separated from each other.

According to an embodiment of the inventive concept, a plurality of brightness degradation patterns P1 to P4 may be disposed on the first to fourth sidewall reflective parts 512a to 512d, respectively. The brightness degradation patterns P1 to P4 may be spaced apart from each other with a uniform distance in the first and second directions DR1 and DR2, and disposed on the first to fourth sidewall reflective parts 512a to 512d, respectively.

In one embodiment, for example, the brightness degradation patterns P1 to P4 may have a gray color and be respectively patterned in the first to fourth sidewall reflective parts 512a to 512d. In one alternative embodiment, for example, the brightness degradation patterns P1 to P4 may have a black color and be respectively patterned in the first to fourth sidewall reflective parts 512a to 512d. However, the inventive concept is not limited thereto. In another alternative embodiment, the structure in which the brightness degradation patterns P1 to P4 are disposed on the first to fourth sidewall reflective parts 512a to 512d and the color of the brightness degradation patterns P1 to P4 may variously change.

In general, the display panel may display an image on the basis of light emitted from the backlight unit. However, when the light is not uniformly provided from the backlight unit to an entire area of the display panel, brightness in the entire area of the display panel may not be uniform. For example, brightness in the edge area of the display panel may be greater than that in the central area of the display panel since the light emitted from the light emitting elements to the sidewall reflective parts is further concentrated to the edge areas of the display panel.

According to an embodiment of the inventive concept, the brightness degradation patterns P1 to P4 for reducing intensity of light may be patterned in the first to fourth sidewall reflective parts 512a to 512d. According to an embodiment of the inventive concept, the light emitting elements LS may include or be defined by white light emitting diodes that emit white light. In such an embodiment, when the white light emitted from the light emitting elements LS is transferred to the brightness degradation patterns P1 to P4 respectively disposed on the first to fourth sidewall reflective parts 512a to 512d, a portion of the white light may be absorbed in the brightness degradation patterns P1 to P4. As a result, the brightness in the edge areas of the display panel may be adjusted.

In an embodiment, the seat reflective part 513 includes first to fourth seat reflective parts 513a to 513d. The first to fourth seat reflective parts 513a to 513d may extend from the first to fourth sidewall reflective parts 512a to 512d, respectively. In such an embodiment, the first to fourth seat reflective parts 513a to 513d may be disposed on or to overlap the seat parts 230 of the second cover member 200, respectively.

According to an embodiment, lengths of the first seat reflective part 513a and the first sidewall reflective part 512a in the second direction DR2 may be the same as each other, and lengths of the second seat reflective part 513b and the second sidewall reflective part 512b in the second direction DR2 may be the same as each other.

According to an embodiment, the third seat reflective part 513c may have a length in the first direction DR1 that is greater than that of the third sidewall reflective part 512c. In such an embodiment, the third seat reflective part 513c includes a first central area CP1 connected to the third sidewall reflective part 512c and a first extension area LP1, and a second extension area LP2 respectively extending from one side and the other side of the first central area CP1 in the first direction DR1.

In one embodiment, for example, one side portion of the first seat reflective part 513a may be connected to the first extension area LP1 of the third seat reflective part 513c, and one side portion of the second seat reflective part 513b may be connected to the second extension area LP2 of the third seat reflective part 513c.

According to an embodiment, the fourth seat reflective part 513d may have a length in the first direction DR1 that is greater than that of the fourth sidewall reflective part 512d. In such an embodiment, the fourth seat reflective part 513d includes a second central area CP2 connected to the fourth sidewall reflective part 512d and a third extension area RP1, and a fourth extension area RP2 respectively extending from one side and the other side of the second central area CP2 in the first direction DR1.

In one embodiment, for example, the other side portion of the first seat reflective part 513a is connected to the first extension area RP1 of the fourth seat reflective part 513d, and the other side portion of the second seat reflective part 513b is connected to the second extension area RP2 of the fourth seat reflective part 513d.

In such an embodiment, each of the first seat reflective part 513a and the second seat reflective part 513b may have a short side in the first direction DR1 and a long side in the second direction DR2. The first seat reflective part 513a and the second seat reflective part 513b may be spaced apart from each other in the first direction DR1.

According to an embodiment, a first coupling opening Gp1 and a third coupling opening Gp3 may be defined in the first seat reflective part 513a. In such an embodiment, the first coupling opening Gp1 and the third coupling opening Gp3 may be defined to be adjacent to both edges of the first seat reflective part 513a in the second direction DR2.

According to an embodiment, a second coupling opening Gp2 and a fourth coupling opening Gp4 may be defined in the second seat reflective part 513b. In such an embodiment, the second coupling opening Gp2 and the fourth coupling opening Gp4 may be defined to be adjacent to both edges of the second seat reflective part 513b in the second direction DR2.

Each of the third seat reflective part 513c and the fourth seat reflective part 513d may have a long side in the first direction DR1 and a short side in the second direction DR2. The third seat reflective part 513c and the fourth seat reflective part 513d may be spaced apart from each other in the second direction DR2 crossing the first direction DR1.

According to an embodiment, each of a first coupling part Ad1 inserted into the first coupling opening Gp1 and a third coupling part Add inserted into the fourth coupling opening Gp4 may be connected to the third seat reflective part 513c. In such an embodiment, the first coupling part Ad1 and the third coupling part Ad3 are connected to be adjacent to both edges of the third seat reflective part 513c in the first direction DR1, respectively.

According to an embodiment, each of a second coupling part Ad2 inserted into the second coupling opening Gp2 and a fourth coupling part Ad4 inserted into the third coupling opening Gp3 may be connected to the fourth seat reflective part 513d. In such an embodiment, the second coupling part Ad2 and the fourth coupling part Ad4 are connected to be adjacent to both edges of the fourth seat reflective part 513d in the first direction DR1, respectively.

As described above, according to an embodiment of the inventive concept, the reflective sheet 510 may be accommodated in the second cover member 200 through a structure in which the first to fourth coupling parts Ad1 to Ad4 are respectively inserted into the first to fourth coupling openings Gp1 to Gp4. In the reflective sheet 510 according to an embodiment of the inventive concept, the fixing tape may not be used to be attached to the first to fourth sidewall reflective parts 512a to 512d to fix the first to fourth sidewall reflective parts 512a to 512d, which are separable from each other, to each other.

Figure 5:
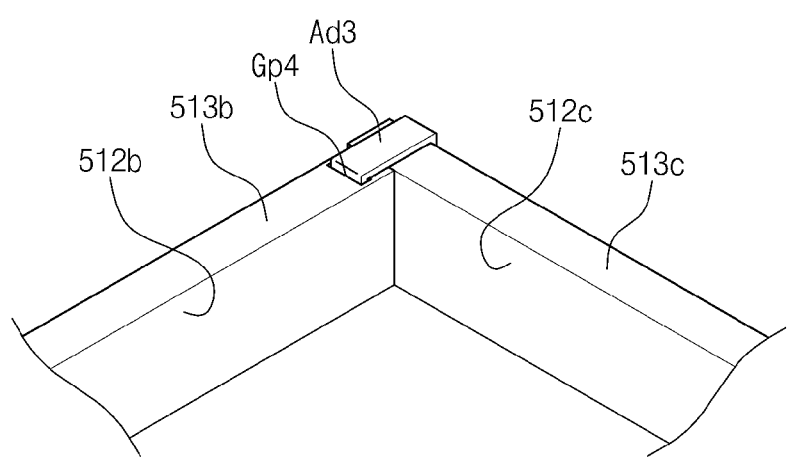
FIG. 5 is a perspective view of a reflective sheet in which a coupling part in FIG. 3 is inserted into a coupling opening.

FIG. 5 is a perspective view of the reflective sheet in which the coupling part in FIG. 3 is inserted into the coupling opening.

In an embodiment, as shown in FIG. 5, a structure in which the third coupling part Ad3 is inserted into the fourth coupling opening Gp4 is illustrated and explained. As illustrated in FIG. 4, before the third coupling parts Ad3 is inserted into the fourth coupling opening Gp4, one side Ja1 of the second sidewall reflective part 512b may be separable from the other side Ja2 of the third sidewall reflective part 512c. In such an embodiment, one end portion of the third coupling part Ad3 is connected to the third seat reflective part 513c.

Referring to FIGS. 3 and 5, the other end portion of the third coupling part Ad3 is inserted into the fourth coupling opening Gp4. As a result, as the one side Ja1 of the second sidewall reflective part 512b contacts the other side Ja2 of the third sidewall reflective part 512c, the second sidewall reflective part 512b and the third sidewall reflective part 512c may be fixed to each other.

In an embodiment, a structure in which the first to fourth coupling parts Ad1 to Ad4 are respectively inserted into the first to fourth coupling openings Gp1 to Gp4 may be the same as the structure in which the third coupling part Ad3 is inserted into the fourth coupling opening Gp4 illustrated in FIG. 5, and any repetitive detailed description thereof will be omitted.

Figure 6A:
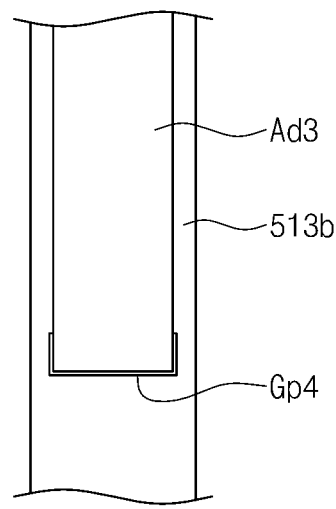
FIG. 6A is a view illustrating a shape of a coupling opening defined in a seat reflective part according to an embodiment of the inventive concept.
Figure 6B:
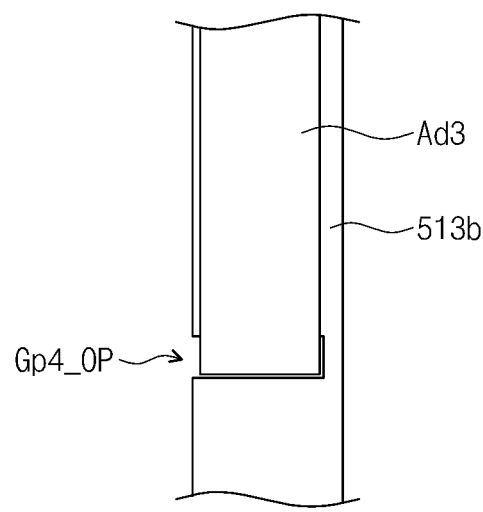
FIG. 6B is a view illustrating a shape of a coupling opening defined in a seat reflective part according to an alternative embodiment of the inventive concept.

FIG. 6A is a view illustrating a shape of a coupling opening defined in a seat reflective part according to an embodiment of the inventive concept. FIG. 6B is a view illustrating a shape of a coupling opening defined in a seat reflective part according to an alternative embodiment of the inventive concept.

In such an embodiment, the fourth coupling opening Gp4 in FIG. 6A may be the coupling opening in FIG. 3. According to an embodiment, the fourth coupling opening Gp4 may be defined in a closed loop shape on a plane of the second seat reflective part 513b, as shown in FIG. 6A. In such an embodiment, the third coupling part Ad3 may be inserted into the fourth coupling opening Gp4.

In an alternative embodiment, as shown in FIG. 6B, a fourth coupling opening Gp4_OP may be a coupling opening. According to an embodiment, as shown in FIG. 6B, the second seat reflective part 513b may have one open side. In such an embodiment, the third coupling part Ad3 may be coupled to the fourth coupling opening Gp4_OP through the one side of the second seat reflective part 513b having the opened shape.

In such an embodiment, the coupling opening Gp4 or Gp4_OP may have a slit structure. However, the inventive concept is not limited thereto. According to another alternative embodiment of the inventive concept, the coupling openings may have various structures.

Figure 7:
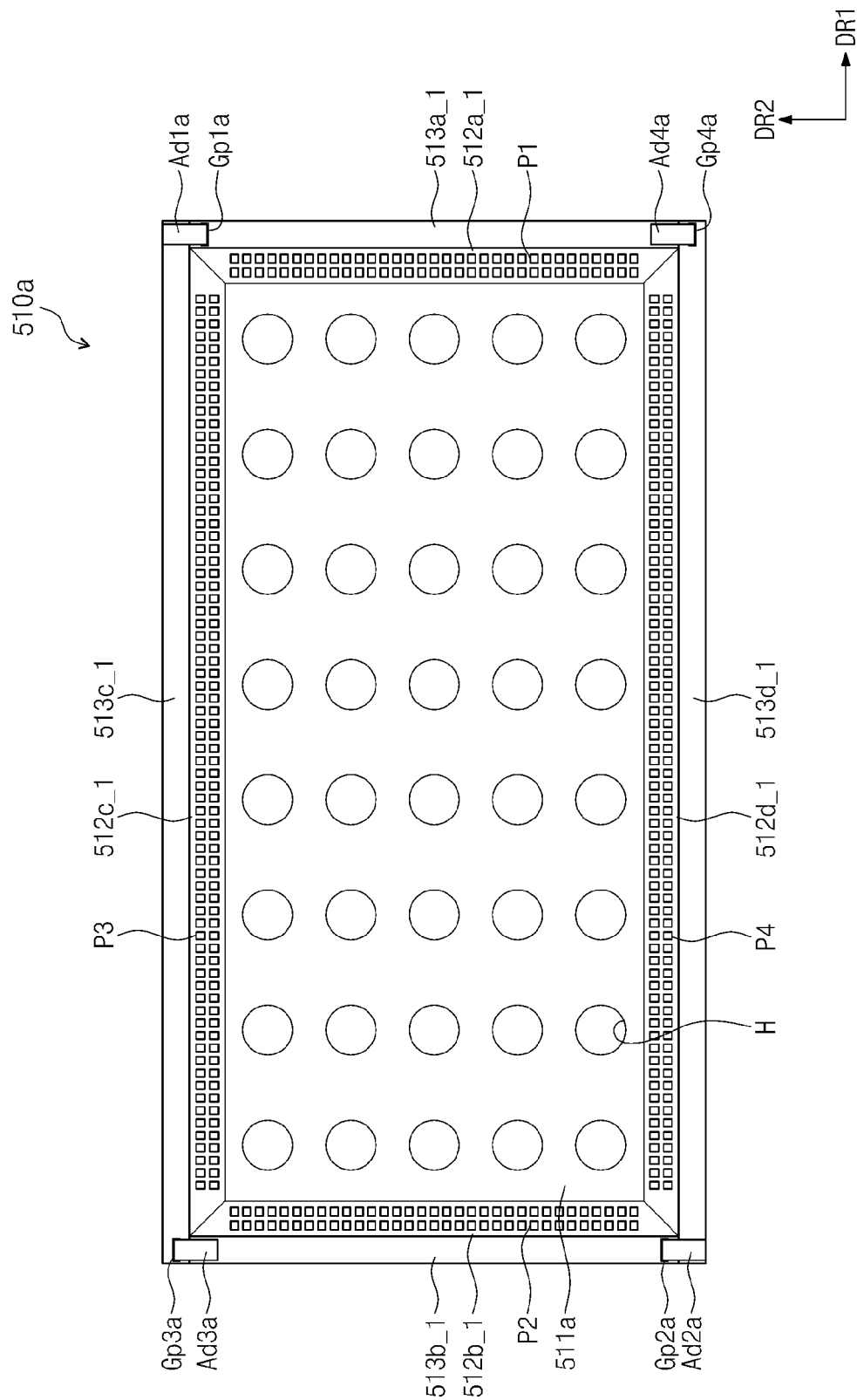
FIG. 7 is a perspective view of a reflective sheet according to an alternative embodiment of the inventive concept.

FIG. 7 is a perspective view of a reflective sheet according to an alternative embodiment of the inventive concept.

The reflective sheet 510a in FIG. 7 is substantially the same as the reflective sheet 510 in FIG. 3, except that first to fourth coupling parts Ad1a to Ad4a and first to fourth coupling openings Gp1a to Gp1b respectively defined in the first to fourth seat reflective parts. Thus, any repetitive detailed description of the same constitutions will hereinafter be omitted.

According to an embodiment of the inventive concept, each of first to fourth seat reflective parts 513a_1 to 513d_1 may include one coupling opening and one coupling part.

In such an embodiment, the first coupling opening Gp1a is defined in the first seat reflective part 513a_1, and the fourth coupling part Ad4a is connected to the first seat reflective part 513a_1. In such an embodiment, the second coupling opening Gp2a is defined in the second seat reflective part 513b_1, and the third coupling part Ad3a is connected to the second seat reflective part 513b_1. In such an embodiment, the third coupling opening Gp3a is defined in the third seat reflective part 513c_1, and the first coupling part Ad1a is connected to the third seat reflective part 513c_1. In such an embodiment, the fourth coupling opening Gp4a is defined in the fourth seat reflective part 513d_1, and the second coupling part Ad2a is connected to the fourth seat reflective part 513d_1.

In such an embodiment, as shown in FIG. 7, the first coupling part Ad1a connected to the third seat reflective part 513c_1 may be inserted into the first coupling opening Gp1a defined in the first seat reflective part 513a_1. The second coupling part Ad2a connected to the fourth seat reflective part 513d_1 may be inserted into the second coupling opening Gp2a defined in the second seat reflective part 513b_1. The third coupling part Ad3a connected to the second seat reflective part 513b_1 may be inserted into the third coupling opening Gp3a defined in the third seat reflective part 513c_1. The fourth coupling part Ad4a connected to the first seat reflective part 513a_1 may be inserted into the fourth coupling opening Gp4a defined in the fourth seat reflective part 513d_1.

As described above, according to an embodiment of the inventive concept, a coupling opening is defined in each of the first to fourth seat reflective parts 513a_1 to 513d_1 of the reflective sheet 510a may include, and a coupling part is connected to each of the first to fourth seat reflective parts 513a_1 to 513d_1 of the reflective sheet 510a, to be coupled to each other. As a result, the first to fourth sidewall reflective parts 512a_1 to 512d_1 may be effectively fixed to each other.

According to embodiments of the inventive concept, the reflective sheet has a structure in which the coupling opening for connecting the cut-out area is defined and the coupling part is included. In such embodiments, the reflective sheet may not use a separate adhesion tape for connecting the cut-out area, such that the overall manufacturing costs may be reduced.

The disclosure has been particularly shown and described with reference to exemplary embodiments thereof. While specific terms were used, they were not used to limit the meaning or the scope of the disclosure described in claims, but merely used to explain the disclosure. Accordingly, a person having ordinary skill in the art will understand from the above that various modifications and other equivalent embodiments are also possible. Hence, the real protective scope of the disclosure shall be determined by the technical scope of the accompanying claims.

What is claimed is:
1. A display device comprising:
a display panel;
a backlight unit disposed under the display panel to provide light to the display panel; and
a cover member which accommodates the backlight unit, wherein the cover member comprises a bottom part, a plurality of sidewall parts bent from the bottom part, and a plurality of seat parts extending from the sidewall parts, respectively,
wherein the backlight unit comprises:
a plurality of light emitting elements disposed on a top surface of the bottom part of the cover member; and
a reflective sheet comprising:
a reflective part overlapping the top surface of the bottom part of the cover member;
a plurality of sidewall reflective parts connected to the reflective part to correspond to the sidewall parts of the cover member, respectively;

a plurality of seat reflective parts connected to the sidewall reflective parts to correspond to the seat parts of the cover member, respectively, wherein coupling openings are defined in at least a portion of the seat reflective parts; and coupling parts extending from the seat reflective parts, respectively, and inserted into the coupling openings, respectively.

2. A display device of claim 1, wherein the seat reflective parts comprise first to fourth seat reflective parts, the first and second seat reflective parts are spaced apart from each other in a first direction, the coupling openings comprise first and second coupling openings defined in the first and second seat reflective parts, respectively, the third and fourth seat reflective parts are spaced apart from each other in a second direction crossing the first direction, and the coupling parts comprise:

a first coupling part extending from the third seat reflective part and inserted into the first coupling opening of the first seat reflective part; and a second coupling part extending from the fourth seat reflective part and inserted into the second coupling opening of the second seat reflective part.

3. The display device of claim 2, wherein the coupling openings further comprise third and fourth coupling openings defined in the first and second seat reflective parts, respectively, and the coupling parts further comprise:

a third coupling part extending from the third seat reflective part and inserted into the fourth coupling opening of the second seat reflective part; and a fourth coupling part extending from the fourth seat reflective part and inserted into the third coupling opening of the first seat reflective part.

4. The display device of claim 2, wherein the coupling openings further comprise third and fourth coupling openings defined in the third and fourth seat reflective parts, respectively, and the coupling parts further comprise:

a third coupling part extending from the first seat reflective part and inserted into the fourth coupling opening; and a fourth coupling part extending from the second seat reflective part and inserted into the third coupling opening.

5. The display device of claim 2, wherein each of the first and second coupling openings has a slit shape.

6. The display device of claim 2, wherein the sidewall reflective parts comprise first to fourth sidewall reflective parts connected to the first to fourth seat reflective parts, respectively, and the first to fourth sidewall reflective parts are separable from each other.

7. The display device of claim 6, wherein the first sidewall reflective part has one side and the other side, which are connected to one side of the third sidewall reflective part and one side of the fourth sidewall reflective part, respectively, and the second sidewall reflective part has one side and the other side, which are connected to the other side of the third sidewall reflective part and the other side of the fourth sidewall reflective part, respectively.

8. The display device of claim 1, wherein the seat reflective parts comprise first to fourth seat reflective parts, the first and second seat reflective parts are spaced apart from each other in a first direction, and the third and fourth seat reflective parts are spaced apart from each other in a second direction crossing the first direction, the sidewall reflective parts comprise a first sidewall reflective part and a second sidewall reflective part, which are connected to the first seat reflective part and the second seat reflective part, respectively, the first seat reflective part has a length in the second direction the same as a length of a first sidewall reflective part in the second direction, and the second seat reflective part has a length in the second direction the same as a length of a second sidewall reflective part in the second direction.

9. The display device of claim 8, wherein the sidewall reflective parts further comprise a third sidewall reflective part connected to the third seat reflective part, and the third seat reflective part has a length in the first direction which is greater than a length of the third sidewall reflective part in the first direction.

10. The display device of claim 9, wherein the third seat reflective part comprises:

a central area connected to the third sidewall reflective part; and first and second extension areas extending from the central area in the first direction to opposite to each other, wherein the first extension area of the third seat reflective part is connected to one side portion of the first seat reflective part, and the second extension area of the third seat reflective part is connected to one side portion of the second seat reflective part.

11. The display device of claim 9, wherein the coupling part is connected to an area of the third seat reflective part which extends further from the third sidewall reflective part when viewed in a plan view.

12. The display device of claim 1, wherein a plurality of brightness degradation patterns are disposed on each of the sidewall reflective parts.

13. The display device of claim 12, wherein each of the brightness degradation patterns has a grey color.

14. The display device of claim 1, wherein a plurality of openings, through which the light emitting elements are exposed, is defined in the reflective part.

* * * * *